Oct. 27, 1964     J. J. M. PRAGNELL     3,154,271
PARACHUTE RIP CORD RELEASE MECHANISM
Filed June 20, 1963     3 Sheets-Sheet 3
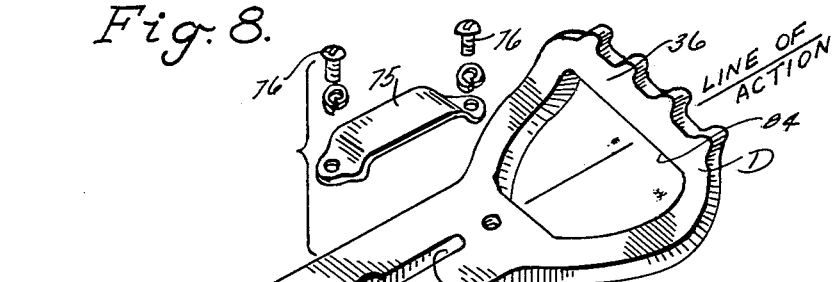
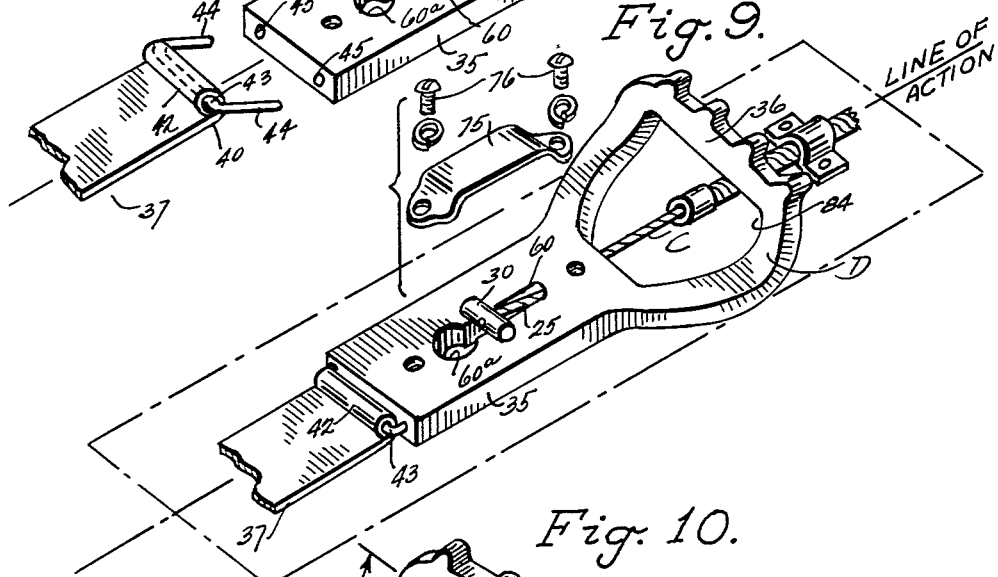
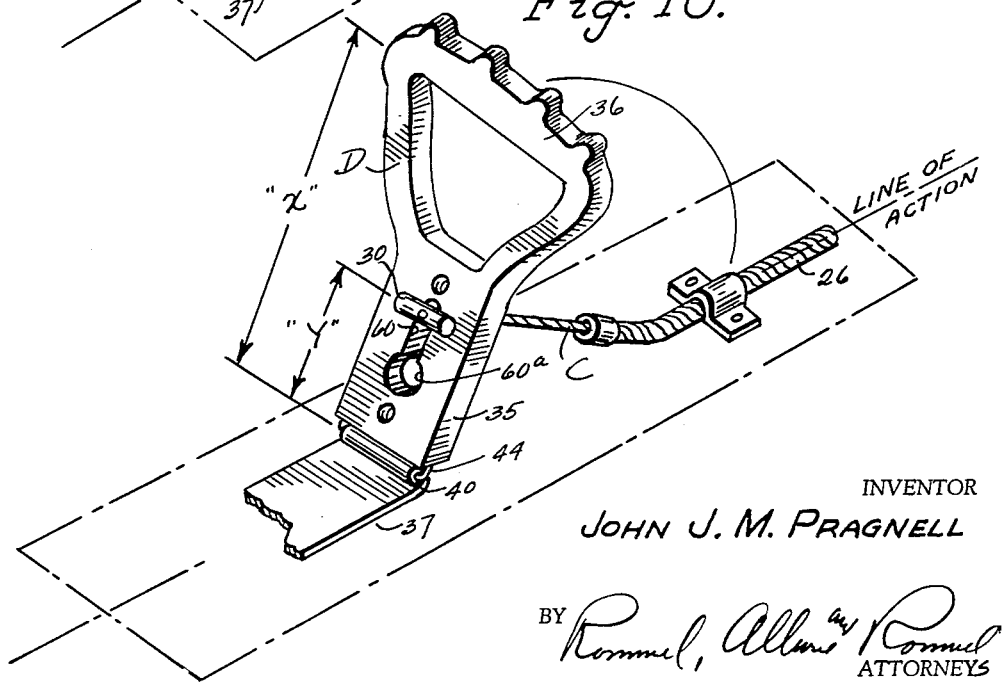
INVENTOR
JOHN J. M. PRAGNELL
BY
ATTORNEYS

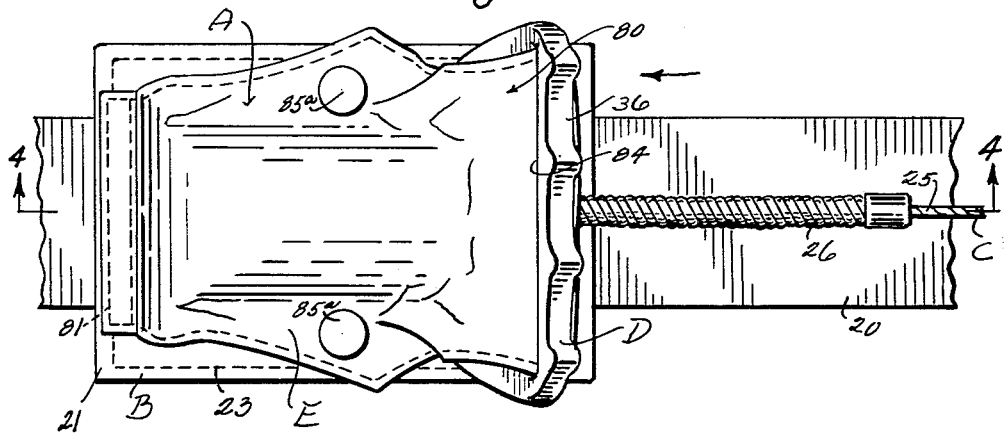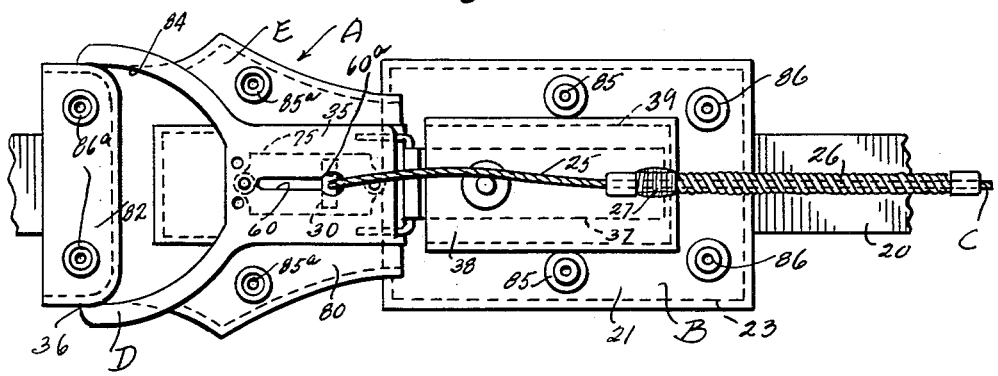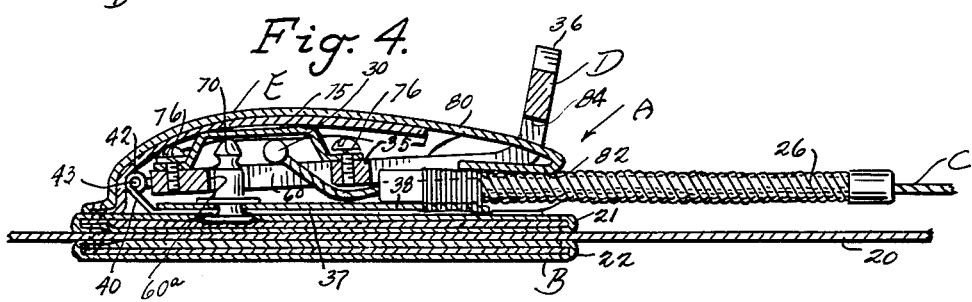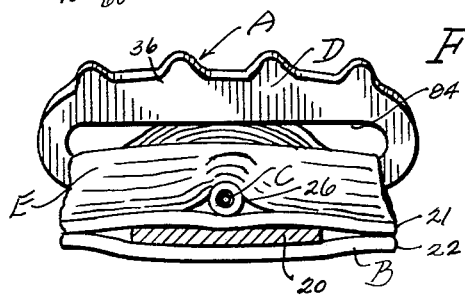

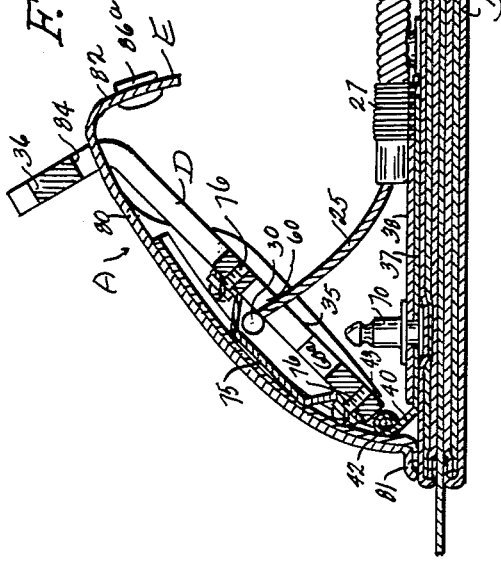

United States Patent Office 3,154,271
Patented Oct. 27, 1964

3,154,271
PARACHUTE RIP CORD RELEASE MECHANISM
John J. M. Pragnell, Tilford, near Farnham, Surrey, England, assignor to Irving Air Chute Company, Inc., Lexington, Ky., a corporation of New York
Filed June 20, 1963, Ser. No. 289,207
12 Claims. (Cl. 244—149)

This invention relates to parachute rip cord release mechanisms.

Conventionally, parachute pack containers are held tightly closed by means of rip cord pins normally holding transversely apertured cones in the grommet openings of the flaps of the parachute pack container. Rip cords are ordinarily pulled by means of pocketed handles. Because of the necessity of tightly compacting modern parachute packs greater loads are placed upon the rip cord pins within the openings of the pack container cones with the result that it is often very difficult to quickly pull the rip cord. It is therefore an object of this invention to provide a type of release mechanism which will enable the rip cord to be easily pulled without undue manual effort.

It is a further object of this invention to provide a release mechanism for parachute rip cord operation consisting of a pivoted lever type handle mounted on a base piece such as a lift web of harness or the container itself which will multiply the manual force exerted by the operator.

It is a further object of this invention to provide an improved rip cord release mechanism for parachute packs including a lever type operating handle pivotally connected to a foundation piece on the parachute harness lift web or pack container; the same being so associated in its mounting and with respect to the rip cord that the handle can be detached from its pivot mounting after the pack has been initially opened or partly opened.

It is a further object of this invention to provide an improved parachute rip cord release mechanism including a pivotal type handle lever with an improved safetying means associated therewith.

Other objects and advantages of this invention will be apparent during the course of the following detailed description.

In the accompanying drawings, forming a part of this specification, and wherein similar reference characters designate corresponding parts throughout the several views:

FIGURE 1 is a plan view of the improved pivoted lever type parachute rip cord release mechanism, showing the same in closed position prior to opening of a pack container and the same being shown as mounted upon a harness web.

FIGURE 2 is an end view of the handle mechanism as shown in FIG. 1, the view being taken in the direction of the arrow shown in FIG. 1.

FIGURE 3 is a fragmentary plan view showing the handle in opened position, at which time the pull upon the rip cord will have removed the locking pins from the parachute container cones, to enable the parachute pack to open.

FIGURE 4 is a cross sectional view taken substantially on the line 4—4 of FIG. 1 and showing the position of the internal parts when the handle is in an inoperative safetied position.

FIGURE 5 is a view showing the handle partially opened.

FIGURE 6 is a view showing the handle at right angles to the line of the rip cord and at which time considerable mechanical advantage in pulling the rip cord mechanism results by reason of leverage association of the parts.

FIGURE 7 shows the handle fully opened.

FIGURE 8 is a developed view of the handle and associated parts showing the handle detached from its pivot mounting.

FIGURE 9 is a developed view similar to FIG. 8 showing the handle mounted upon its pivot details.

FIGURE 10 is a developed view of the handle, its pivot and the rip cord with the handle partially opened.

In the drawings, is shown a preferred parachute rip cord release mechanism A. It includes a mounting base piece B, a rip cord C; lever type handle D and releasable safetying means E which is attachable to a lift web in the nature of a pocket, as disclosed in the drawings.

The support or mounting piece B may consist of part of the pack container or, as shown in the drawings, it may be attached to and form part of a harness riser web 20. While flexible, it is quite stiff and capable of adequately supporting the release mechanism. Preferably it is composed of outer and inner flexible pads or webs 21 and 22 stitched together at 23, as shown in FIG. 2. The pads 21 and 22 are located at opposite sides of the harness web 20.

The rip cord assembly C preferably consists of a flexible cable 25, generally of twisted wire, slidably mounted within a flexible tube 26 which may be attached at 27 on the outer pad 21 of the base piece B. The rip cord 25 has the usual locking pins 28 thereon adapted for insertion through the cone apertures on the flaps of the parachute pack container, as will be well understood in the art to which this invention relates. The rip cord 25 at the release mechanism end is provided with a fixed cross head 30 in T-shaped relation with the run of the rip cord, as is best shown in FIG. 9 of the drawings.

Referring to the handle structure D, the same may be of rigid metal or plastic. It includes a body 35 having at one end a hand inserting grip 36, as shown in FIG. 10. The body 35 at the end opposite the grip is provided with a hinge construction consisting of a plate 37 which is permanently fixed by means of webbing 38 upon the base piece B. This webbing 38 is stitched as shown at 39 in FIG. 3 to the base piece. The plate 37 has an angled end portion 40 extending outwardly from the webbing 38, which at its outer end has a barrel shaped portion 42 the passageway of which is adapted to receive a U-shaped pintle 43. Pintle 43 is received within the passageway of the barrel 42 and it has right angled legs 44 which are adapted for detachable reception in sockets 45 located endwise in the end of the handle body 35 opposite the grip 36. These pintle ends 44 are detachable from their sockets 45 in order that the operator can be assured of complete release of the rip cord after the handle has been pulled.

The body 35 of the handle is provided with an elongated slot 60 along the line of action of the release mechanism as shown in FIGS. 8, 9 and 10, and this slot at its lower end is enlarged at 60$^a$. Thus, the body 35 has a keyhole type of slot through it and the purpose of which will be further described.

It will be noted that the rip cord 25 extends through the slot 60 and the cross head 30 rides along the outer face of the handle and cannot pass through this slot.

In order that the handle, when closed, cannot be displaced laterally or longitudinally, a handle placement stud 70 is riveted or otherwise secured through the upper pad 21 of the base piece B; the head thereof being adapted to extend into and through the opening 60ª. This stud 70 at its base also extends through the hinge plate 37 to hold it in place. It also obstructs or limits the play of the cross head 30 along slot 60 until the handle is opened.

A guard and cover plate 75 which is of elongated U-shaped cross section is detachably connected by bolts 76 to the body 35. In position its body is raised from the outer surface of the body portion 35 of the handle, as is shown in FIGS. 4, 5, 6 and 7 of the drawings; this spacing being such that the cross head 30 of the rip cord can freely slide longitudinally of the cover plate without interference, under influence of pulling the handle.

It will be noted that the cross head 30 moves within the confines of the end walls of the cover plate 75, the length of the keyhole slot portion 60. This limited longitudinal movement accommodates any small shortening or lengthening movements of the rip cord caused by flexing of the pack or cable housing, etc. These movements are free to take place at any time while the handle is in closed or inoperative position, as will be obvious from FIG. 4, without liability of the rip cord pins being pulled from the pack container cones.

Referring to FIG. 10, the distances "X" and "Y" will be noted. They offer a substantial increase in leverage to the pulling action on the rip cord.

Assuming the handle to be parallel to the line of action of the rip cord, rotation of the handle through the first few degrees will be facilitated because of limited relative movement between the rip cord and the handle, delaying the placing of the rip cord under tension. When the handle has been rotated so that it forms an angle with the line of action of the rip cord greater than the right angle, limited relative movement in the reverse direction can take place, thus further increasing the mechanical leverage advantage afforded by the handle.

Referring to the releasable safetying means E, the same comprises a flexible pocket flap 80 stitched at 81 onto the lower end of the base pad B. From that location it flares out and is provided with an upper extension 82 adapted to be extended through the handle-grip opening 84. The base pad B is provided with two lower snap fastener studs 85 for receiving the sockets 85ª located on the intermediate portion of the safety cover 80. Furthermore, the base piece B at its upper end is provided with a pair of snap fastener extensions 86 adapted to receive sockets 86ª located on the portion 82 of the cover as shown in various views of the drawings, it being intended that the studs 86 are inversely positioned on the cover 80 with respect to the studs 85ª, since the portion 82 of the cover is adapted to be folded under as shown in FIG. 4.

Assuming the handle to be closed as shown in the position of FIG. 4, when the operator inserts his hand through the opening 84 of the handle grip, which is upturned as noted in the drawings, and pulls, the force of the pull will cause the snap fastener sockets 85ª and 86ª to be released from their studs on the base piece B. This cover thus provides a safetying means although in lieu thereof frangible tie threads, elastic bands, spring clips, etc., could be used.

Various changes in the size, shape and arrangement of parts may be made to the form of invention herein shown and described without departing from the spirit of the invention or scope of the claims.

I claim:

1. In parachute rip cord release mechanism the combination of a mounting base, a handle, pivot means fixedly connected to the base and having a detachable connection with the handle enabling the handle to pivot on the base and be detached with respect thereto incident to a pull of the rip cord when the handle is substantially opened, and a rip cord connected to said handle spaced from said pivot means.

2. The release mechanism of claim 1 in which the rip cord is so connected to the handle as to have a limited free play movement therealong when the handle is in closed position upon said mounting base.

3. The release mechanism of claim 2 in which flexible safety pocketing means is mounted upon said mounting base having means for detachable connection of the same on the mounting base to normally releasably hold the handle in inoperative closed position upon said mounting base.

4. In a parachute rip cord release mechanism the combination of a mounting base, an elongated handle having a hand grip at the outer end thereof, pivot means mounted on the mounting base having a detachable connection with the handle remote from said grip whereby the handle may be released from said pivotal mounting means as an incident of pull of the handle when the latter is opened, other means mounted on said mounting base having a releasable interconnection with the handle when the latter is in closed position to prevent lateral and endwise movement of the handle, and a rip cord having a connection with said handle between its pivot mounting and grip.

5. A release mechanism as described in claim 4 in which a safety pocketing cover is mounted on said mounting base having detachable snap fastener connections therewith whereby to normally hold the handle in inoperative position until subjected to a pulling force.

6. In a parachute rip cord release mechanism the combination of a mounting base, an elongated handle having a hand grip thereon, means pivotally mounting the handle on the base at its end opposite the hand grip, said handle having an opening therein close to its pivot, a stud on the mounting base located to extend across said opening at a location spaced from the pivot axis of the handle on said mounting piece whereby to laterally and longitudinally hold the handle against substantial lateral movement when closed, a rip cord, and means mounting the rip cord upon said handle between its handle grip and pivot mounting.

7. The parachute rip cord release mechanism defined in claim 6 in which the handle is provided with a slot communicating with said handle opening, said rip cord being freely slidably extended through said slot and having a cross head wider than said slot to hold the cross head in position upon the handle during operational movements of the handle.

8. In a parachute rip cord release mechanism the combination of a mounting base, a handle, pivot means mounted on said base having a sliding connection with said handle whereby incident to a pull of said handle it will detach therefrom, and a rip cord connected to said handle spaced from said pivot mounting of the handle.

9. The rip cord release mechanism as defined in claim 8 in which the pivot connection of the handle on said base comprises a hinge part fixedly connected to said base having pin-like extension means slidably and detachably mounted in the handle.

10. The parachute rip cord release mechanism as defined in claim 8 in which the pivot means is mounted on said base having a stud extension and the handle is provided with an aperture to receive said stud extension when the handle is closed whereby to limit lateral and longitudinal movement of the handle upon said base and to maintain the hinge pivot connection of the handle upon said base.

11. In a parachute rip cord release mechanism the combination of a mounting base, a handle having a hand grip at one end thereof, a connection on said base pivotally connecting the handle at its end opposite the grip upon said mounting base, said handle having an elongated keyhold type slot with a narrow elongated portion and at its end being provided with a wider aperture between the elongated slot and the pivot of the handle on said base, a stud mounted on said base in position to extend in said aperture to limit the play thereof laterally and longitudinally when the handle is closed upon said base, a rip cord having a cross head at an end thereof, said rip cord slidably extending through the slot from below it and the cross piece extending across the upper surface of said handle and being wider than the width of said slot and aperture whereby to maintain the rip cord in connection upon said handle.

12. A parachute rip cord release mechanism as defined in claim 11 in which the stud, when the handle is closed, limits the movement of the cross piece as the rip cord moves along said slot, and wherein the handle is provided with a fixed cover to limit the movement of the cross piece upon said handle.

References Cited by the Examiner
FOREIGN PATENTS

| | | |
|---|---|---|
| 791,444 | 9/35 | France. |
| 823,020 | 10/37 | France. |
| 475,245 | 11/37 | Great Britain. |

FERGUS S. MIDDLETON, *Primary Examiner.*